July 20, 1965    J. HIRSCH    3,195,926
PEG BOARD

Filed Nov. 6, 1963    4 Sheets-Sheet 1

JACOB HIRSCH
INVENTOR.

BY Robert Ames holt
ATTORNEY

July 20, 1965  J. HIRSCH  3,195,926
PEG BOARD

Filed Nov. 6, 1963  4 Sheets-Sheet 2

JACOB HIRSCH
INVENTOR.

BY *Robert Ames Norton*
ATTORNEY

July 20, 1965  J. HIRSCH  3,195,926
PEG BOARD

Filed Nov. 6, 1963  4 Sheets-Sheet 4

JACOB HIRSCH
INVENTOR.

BY *Robert Kimer Norton*
ATTORNEY

United States Patent Office 3,195,926
Patented July 20, 1965

3,195,926
PEG BOARD
Jacob Hirsch, 420 North St., Harrison, N.Y.
Filed Nov. 6, 1963, Ser. No. 321,937
6 Claims. (Cl. 282—29)

This invention relates to an improved peg board for the rapid posting of accounts.

Posting of various accounts including the making out of checks and other elements constitutes a very large portion of the clerical labor involved in ordinary accounting. A number of entries have to be made and a brief reference to one of the typical operations, payroll, and posting is illustrative. A payroll check usually has the payee's name and amount of the check in the middle of the check vertically and then a series of boxes, usually along the top or bottom of the check containing such information as employee's number, breakdown of the payment into straight time and overtime, deductions, withholding taxes and the like. The check itself has to be made out, both the amount and name together with the information in the boxes referred to above and posted onto a payroll journal sheet. A similar entry is required in the employee's individual payroll ledger card or page. A similar sequence is needed when accounts are paid, again a check has to be made out, information transferred to a disbursement journal and posted onto the ledger sheet for the supplier. Other accounting operations sometimes require a similar sequence of operations though the two referred to above constitute the most common.

If all of the various entries are made separately there is a great increase in time required and a much greater chance of error. If it is attempted to perform more than one operation at a time, for example by carbon strips or by other manifolding material so that the writing of the check transfers onto the ledger and the journal sheet it is still necessary to align the entries so that the relevant information appears on the proper line and proper columns of the journal sheet and the ledger card. Alignment is time consuming and the possibility of error or misalignment is always present.

A distinct advance was made by providing a peg board described and claimed in the patent to Doerner 2,828,977, April 1, 1958. Increased speed of posting results as the motion of the carrier permits transferring two entries on the check to different points on the same line of the journal sheet.

The present invention performs the functions described in the above patent and performs additional functions and effects additional economies in time and improvements in accuracy which will become apparent after consideration of the drawbacks which the Doerner peg board still possesses. Primarily these drawbacks relate to the fact that each check or similar piece of paper has to be placed on its carrier and the proper ledger sheet aligned with the proper journal line by putting the proper ho'e over the locating pins and by manually moving the journal sheet. These operations take time and they also make it possible to effect a misalignment. This is not because the eye cannot tell definitely which line of the journal sheet should line up with the ledger card but because if it is attempted to operate rapidly, an essential if clerical time is to be saved, it is easy to misalign. Also it is easy to forget to move the journal sheet up one line. The result is a slow operation if the clerk is to be sure that the alignment is accurate.

The present invention utilizes all of the advantages of the moving carriage of the Doerner patent. It also has a moving carriage and the motion of the carriage lines the two parts of the check or other paper over the correct columns of the journal sheet. The board of the present invention also automatically advances the journal sheet after the carriage has made its full back and forth movement. This is an important new function which increases speed and eliminates possibility of error.

Similarly all of the ledger sheets which are to be used in posting, for example for a batch of checks or for a batch of invoices, are stacked on a second element which slides up and down the opposite, usually the right hand, side of the board. Alignment is usually still necessary because the next line on the ledger sheets may not and in fact often will not coincide with the next free line of the journal sheet. Therefore in the present invention there is provided a means for sliding the member carrying the stacked ledger sheets up and down. Alignment need be only very rough because in the present invention when the handle used in moving the second element is released, a spring causes it to return to its original position and to force a pin in to a particular tooth of a long saw tooth member rigidly attached to the board. This creates automatic perfect aligning because if the alignment, by rapidly moving the ledger up and down, is somewhat off, let us say it is a third of the way down from the proper position in a line, the pin will force the carrier to move up so that the alignment is perfect. This results in a very great increase in speed. First it is possible to move very rapidly because the alignment by eye need to be only extremely rough and secondly, as soon as a posting is effected, the ledger card or sheet is removed and the next one in the stack is automatically then presented. Time is saved and the possibility of error due to misalignment or to double inclusion, for example if the clerk is momentarily interrupted, is avoided. The next ledger card automatically warns the clerk which invoice or which check should next be written. There is therefore both a great saving in time and an increase in accuracy. Particularly there is no precise aligning job of putting exactly the right hole in a ledger card over the aligning pins which after posting for some time becomes a very tiring operation.

It is an important practical advantage of the present invention that all of the desirable features of Doerner patent are retained and at the same time the new functions and improved operation is obtained without any significant increase in cost. The sliding ledger carrying member with a fixed saw tooth on the board and spring pressed handle is extremely cheap to manufacture and adds but a negligible amount to the total cost of the board. Similarly the automatic moving of the journal is also effected by a relatively cheap mechanism.

The movable carriage is also provided with means for stacking checks and folding all but the bottom check back. After writing, the bottom check is torn off and the next one folded down.

The invention will be described in greater detail in conjunction with the drawings in which.

Figure 1:
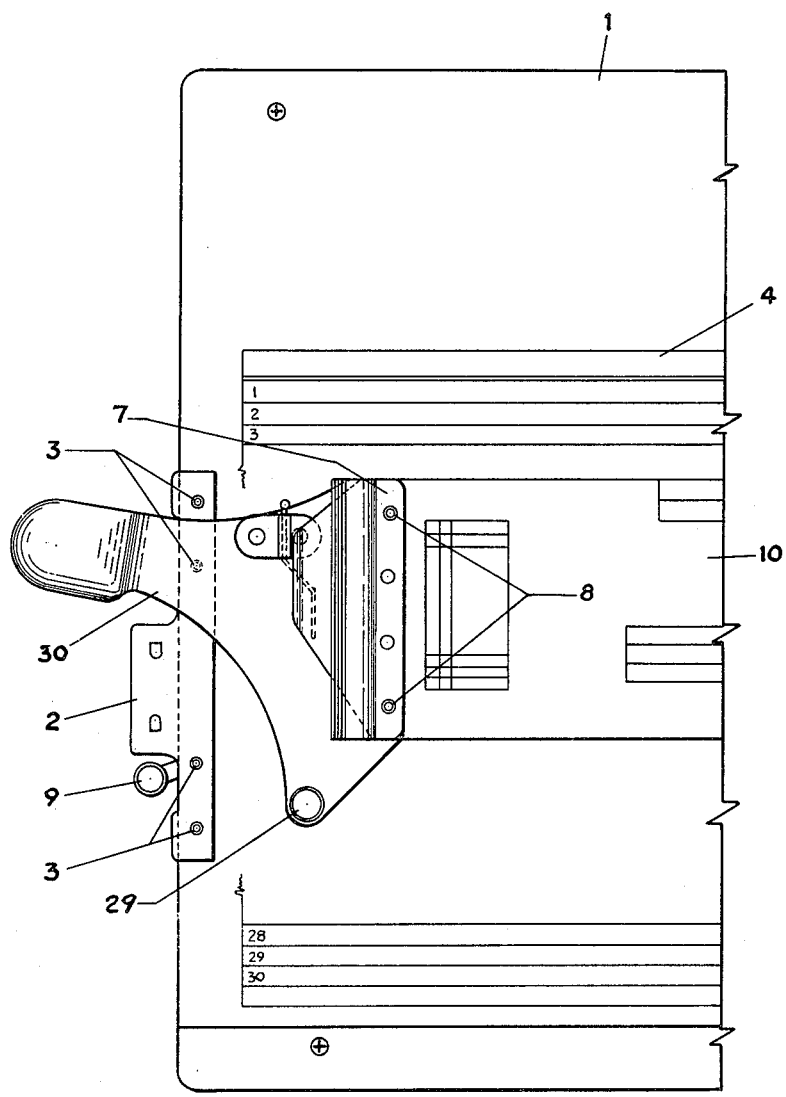
FIG. 1 is a plan view of the front left hand side of a peg board.

Turning to FIG. 1, the board itself appears at 1 and can be made of any suitable material, laminated thermosetting plastic being very satisfactory as it does not warp and has a smooth surface. Sliding along the left side of the board is an element 2 which is provided with four locating pins 3 and with a release catch knob 9 which when depressed permits the member 2 to be moved up and down the board. On the sliding element there is located a journal sheet 4 which is positioned on the pins 3. Because the journal sheet is of the same form and attached to a similar kind of element as in the Doerner patent it is shown with only a few lines indicated and without indication of columns. However although carrier element mounts the journal sheet in a similar manner the Doerner element does not move automatically as is the case in the present invention.

Figure 3:
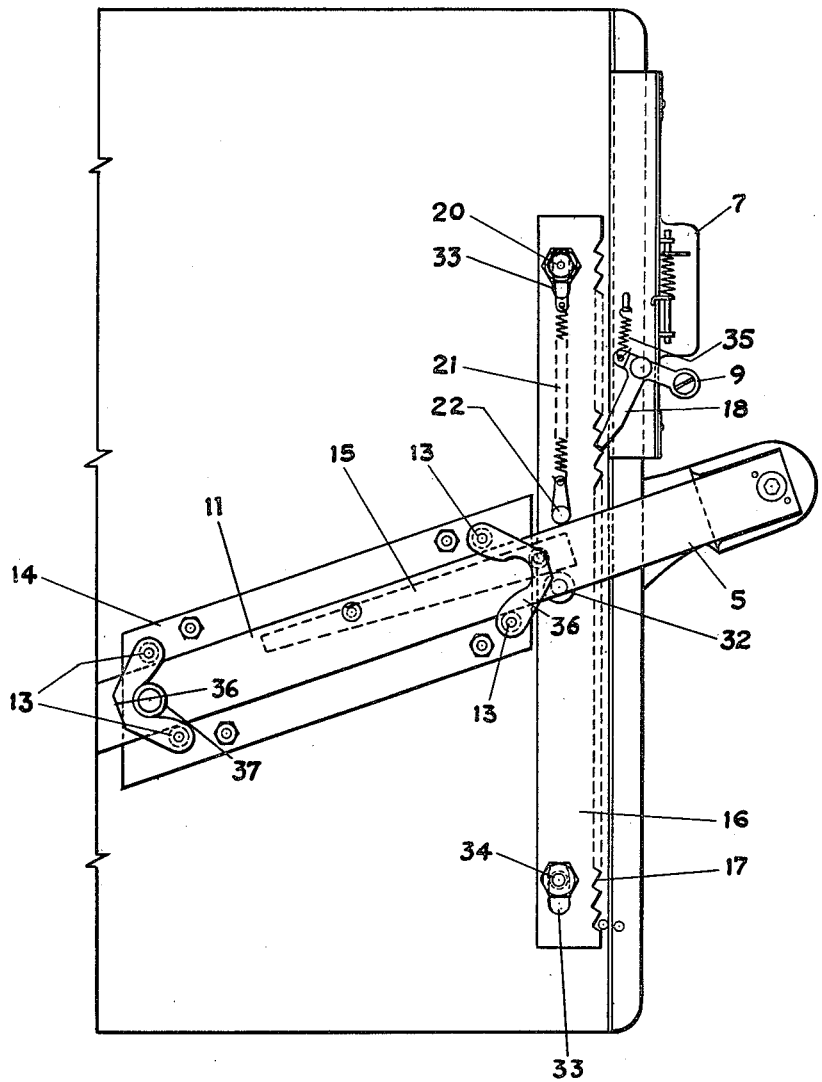
FIG. 3 is a plan view of the bottom left side of the board.

Checks or other papers are fastened onto a diagonally movable carriage shown generally at 30 with a knob 29. The checks are aligned by two pins 8 and held in a stack by a clip 7. The carriage moves by means of a slide 5 in a diagonal manner in a plate 14 and rollers 13 which are mounted on the plate 14. The mechanism for moving the carriage is best seen on FIG. 3. The diagonal movement of the slide 11 is limited by a rubber stud 37 and stops 36.

It will be noted that the diagonal motion of the carriage is opposite to that in the Doerner patent as the checks are designed with boxes at the top instead of boxes at the bottom. The direction of the slide is a matter of choice. The slide carries a cam 15 on which a roller or cam follower 32 moves. This in turn is fastened to a strip of metal 16 provided with saw teeth 17. The strip of metal is capable of limited movement because of the slots 33 which move on pins 34 attached to the board itself. The amount of movement is slightly greater than the distance from one saw tooth to another. A pawl 18 is pivoted on the underside of the journal sheet carrier 2 and is urged against the teeth 17 by the spring 35. The knob 9 can be manually operated to disengage the pawl so that the holder 2 can be moved up and down the side of the board for initial alignment with a next free line of the journal sheet. Thereafter movement of the journal sheet is automatic, when the carriage 30 is moved diagonally up to the left.

After writing the payee and amount on a check or similar writing on other papers, the carriage 30 is pushed all the way in. This aligns the other portions of the check or paper with the proper columns on the journal sheet and ledger card as has been described above and at the same time the movement of the slider 5 carrying the cam 15 with it causes the metal strip 16 to move one tooth. After the entries have been made in the boxes on the check or other paper and transferred automatically to the journal sheet and ledger card, the carriage 30 is moved up to the left and this causes the metal strip 16 to move up one notch since the strip is attached through the pin 22 to a spring 21 and a pin 20 on the board. This movement results in moving the journal sheet carrier 2 up one line.

As has been described above the stack of checks was initially folded back over the clip 7 with the exception of the bottom check. This is then torn off and the next check flipped down without any necessity of aligning it.

Figure 2:
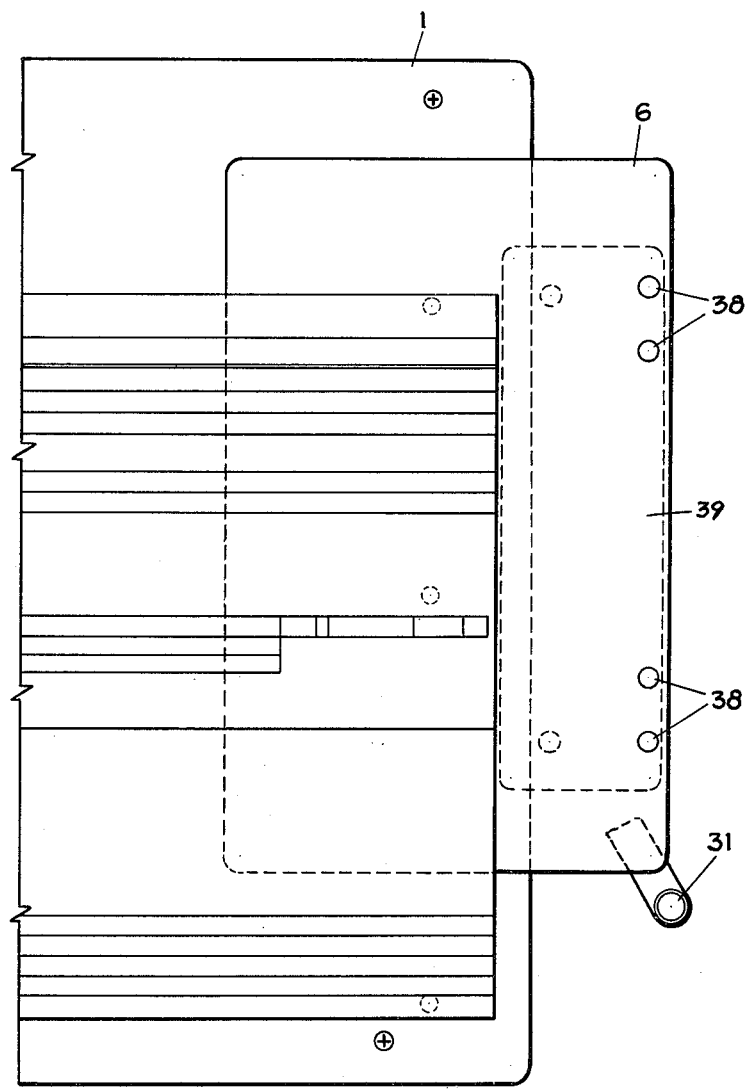
FIG. 2 is a similar view of the front right hand side.
Figure 4:
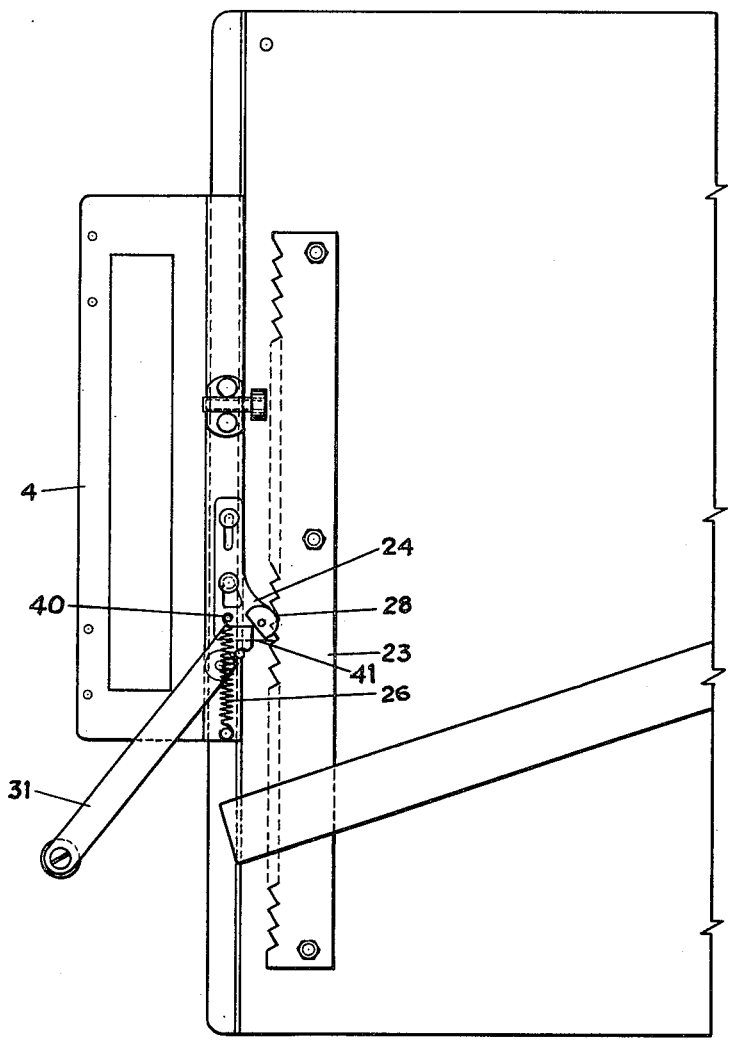
FIG. 4 is a similar plan view of the bottom right hand side of the bottom of the peg board.

Another feature of the present invention is illustrated in FIGS. 2 and 4. Ledger cards or sheets 6 are stacked on four pins 38 on a movable carrier 39 which can slide up and down the edge of the board. The operation of this carrier is best seen on FIG. 4. A handle 31, only the end of which appears on FIG. 2, moves a member 24 which is provided with a pin and a roller 40 on a pawl 41 between two half washers 28 engages the saw tooth edge of the member 23 rigidly attached to the bottom of the board. When the lever 31 is moved in toward the board the pawl 41 is moved out of contact with the teeth on the member 23 and the ledger card carrier 39 may be slid up or down the right hand side of the board. It is slid until approximate alignment with the next empty line on a ledger card with a corresponding empty line on the journal sheet takes place. This can be done very quickly as precise alignment is in no sense necessary because as soon as the lever 31 is allowed to move back into its normal position by spring 26 the pawl 41 is forced down the sloping side of the particular saw tooth and a slight movement of the carrier 39 results so that there is always accurate alignment of the particular line on the ledger card with a particular line on a journal sheet.

Posting is then effected on the journal sheet and it is transferred by carbon or other means to the ledger card in the normal way. As soon as the data are posted, the top ledger card is removed, the carriage 30 of course is then returned to its left hand position which causes slide 2 to advance to the next vacant journal sheet line and the next ledger card is exposed. Alignment of the succeeding ledger cards is effected as described above and the posting operations repeated.

It has been pointed out above that the invention is not limited to any particular design of diagonally moving carriage. However the preferred design illustrated in the drawings in which movement of the journal sheet is effected by a cam and roller is simpler and requires few parts.

I claim:

1. In a peg board for the simultaneous posting of data on checks or similar paper onto journal sheets and ledger sheets and provided with a journal sheet carrying member slideably movable along one edge of the board and a carriage movable diagonally from an initial position to a second position and back, said carriage carrying a check holder with aligning pins, the back and forth movement of the carriage permitting entries from the check or other paper at two different points on the journal sheet to appear on the same line but laterally displaced, the improvement which comprises, (a) a separate element movable parallel to the journal sheet carrying member through a distance equal at least to one journal sheet line,
   (b) means actuated by the first movement of the carriage from its initial position to move the separate element through a distance corresponding to one journal sheet line,
   (c) latching means connecting the journal sheet carrying member to the separate member at the end of the movement, and
   (d) means actuated by the movement of the movable carriage back to its initial position permitting the separate element, and with it the journal sheet carrying member latched thereto, to move a distance equal to one journal sheet line.

2. A peg board according to claim 1 in which the separate element is a movable element provided with saw teeth spaced one journal sheet line apart, the latching means is a spring pressed pawl which snaps into the next tooth on the first movement of the diagonal carriage which is provided with a cam engaging a follower on the separate element and moving it one journal sheet line against the pull of a spring.

3. In a peg board for the simultaneous posting of data on checks or similar paper onto journal sheets and ledger sheets and provided with a journal sheet carrying member slideably movable along one edge of the board and a carriage movable diagonally from an initial position to a second position and back, said carriage carrying a check holder with aligning pins, the back and forth movement of the carriage permitting entries from the check or other paper at two different points on the journal sheet to appear on the same line but laterally displaced, the improvement which comprises, (a) a separate element movable parallel to the journal sheet carrying member through a distance equal at least to one journal sheet line,
   (b) means actuated by the first movement of the carriage from its initial position to move the separate element through a distance corresponding to one journal sheet line,
   (c) latching means connecting the journal sheet carrying member to the separate member at the end of of the movement,
   (d) means actuated by the movement of the movable carriage back to its initial position permitting the separate element, and with it the journal sheet carrying member latched thereto, to move a distance equal to one journal sheet line, (e) a ledger card holder provided with and capable of receiving a stack of ledger cards said holder being slideably movable on the side of the board opposite the journal sheet carrier, (f) an aligning member having positions for aligning with each line of the journal sheet, (g) means for relatively moving the aligning member and the stacked ledger card holder, said means including a releasing catch, and (h) means actuated by release of the catch moving the ledger card to precise alignment over a distance not exceeding a line.

4. A peg board according to claim 3 in which the ledger card carrier aligning means includes a toothed member attached to the underside of the peg board and a pivoted pawl means actuated by a lever on the ledger card carrier, said lever in one position releasing the pawl and permitting sliding of the ledger card carrier up and down along the side of the peg board until rough alignment is achieved and said pawl being shaped with respect to the teeth on the tooth member so that on releasing of the lever the pawl is forced into the bottom of the next tooth and moves the index card carrier into precise alignment.

5. A peg board according to claim 3 in which the separate element is a movable element provided with saw teeth spaced one journal sheet line apart, the latching means is a spring pressed pawl which snaps into the next tooth on the first movement of the diagonal carriage which is provided with a cam engaging a follower on the separate element and moving at one journal sheet line against the pull of a spring.

6. A peg board according to claim 5 in which the ledger card carrier aligning means includes a toothed member attached to the underside of the peg board and a pivoted pawl means actuated by a lever on the ledger card carrier, said lever in one position releasing the pawl and permitting sliding of the ledger card carrier up and down along the side of the peg board until rough alignment is achieved and said pawl being shaped with respect to the teeth on the tooth member so that on releasing of the lever the pawl is forced into the bottom of the next tooth and moves the index card carrier into precise alignment.

References Cited by the Examiner
UNITED STATES PATENTS

| | | | |
|---|---|---|---|
| 2,524,128 | 10/50 | Jones | 282—29.2 |
| 2,589,884 | 3/52 | Solway | 282—29.2 |
| 2,722,436 | 11/55 | Pfeiffer | 282—29.2 |
| 2,828,977 | 4/58 | Doerner | 282—29.2 |
| 2,952,478 | 9/60 | Lortie | 282—29.2 |

EUGENE R. CAPOZIO, *Primary Examiner.*

LAWRENCE CHARLES, LEONARD W. VARNER, Jr., *Examiners.*